United States Patent [19]
Babines et al.

[11] Patent Number: 5,238,697
[45] Date of Patent: * Aug. 24, 1993

[54] FRIED PASTA SNACK FOOD

[75] Inventors: Michael R. Babines, Mars; Phillip B. Sky; Barry A. D'Andrea, both of Altoona, all of Pa.

[73] Assignee: Designer Snacks, Inc., Altoona, Pa.

[*] Notice: The portion of the term of this patent subsequent to Jul. 7, 2009 has been disclaimed.

[21] Appl. No.: 886,862

[22] Filed: May 22, 1992

Related U.S. Application Data

[63] Continuation of Ser. No. 603,217, Oct. 25, 1990, Pat. No. 5,128,166.

[51] Int. Cl.[5] .......................... A23L 1/16; A23L 1/217
[52] U.S. Cl. ........................... 426/557; 426/439; 426/440; 426/516; 426/559; 426/808
[58] Field of Search .............. 426/557, 439, 440, 559, 426/808, 516

[56] References Cited

U.S. PATENT DOCUMENTS

| | | | |
|---|---|---|---|
| 2,615,809 | 10/1952 | Jean | 426/440 |
| 3,318,707 | 5/1967 | Ernst | 426/451 |
| 3,462,276 | 8/1969 | Benson | 426/391 |
| 3,728,130 | 4/1973 | Egan et al. | 426/557 |
| 3,849,582 | 11/1974 | Blagdon et al. | 426/550 |
| 3,997,676 | 12/1976 | Ando | 426/439 |
| 4,166,139 | 8/1979 | Ishida | 426/557 |
| 4,185,125 | 1/1980 | Sakakwara et al. | 426/557 |
| 4,230,735 | 10/1980 | Yoshida et al. | 426/557 |
| 4,469,711 | 9/1984 | Seltzer | 426/557 |
| 4,540,590 | 9/1985 | Harada et al. | 426/557 |
| 4,675,199 | 6/1987 | Hsu | 426/557 |
| 4,763,569 | 8/1988 | Wenger et al. | 426/451 |
| 4,769,251 | 9/1988 | Wenger et al. | 426/451 |
| 4,783,339 | 11/1988 | Horner | 426/557 |
| 4,875,847 | 10/1989 | Wenger et al. | 426/557 |

Primary Examiner—Jeanette Hunter
Assistant Examiner—Mary S. Mims
Attorney, Agent, or Firm—Banner, Birch, McKie & Beckett

[57] ABSTRACT

A healthful snack food containing wheat flour is made by frying a readily hydrated pasta product made by an extrusion process using low shear cooking conditions and moisture venting before extrusion.

3 Claims, 1 Drawing Sheet

FRIED PASTA SNACK FOOD

This application is a continuation of allowed Ser. No. 07/603,217 filed on Oct. 25, 1990, now U.S. Pat. No. 5,128,166.

FIELD OF THE INVENTION

The invention relates to a fried pasta snack food product that is easy to consume, crunchy, and exhibits a pleasant taste. The invention also involves the method of manufacturing such a snack food.

BACKGROUND OF THE INVENTION

The market offers a number of snack foods with varying degrees of nutritional value. Fried pasta snack foods are desireable over other types of snack foods because pasta is based on wheat. Wheat, of course, is a complex carbohydrate that satisfies hunger without providing high levels of sugar and fats.

The problem with conventional fried pasta snack foods is one of texture and crunch. Conventional pasta extrusion processes produce a dense, coherent flour and water product that, when fried, either overexpands to form an airy product lacking a satisfying substantiality. Overly light products do not provide a sufficient bulk to satisfy the hunger causing snacking. On the other hand, an underexpanded fried pasta forms a heavy mass with a hard, unpleasant crunch which deters casual consumption by all but the most determined. Either an unsatisfying bulk or unpleasant crunch force will cause consumers to turn away from relatively healthy pasta to more easily consumed, but less healthy, snack foods.

It would be desireable to have a manufacturing process for making a fried, extruded pasta product that would expand and from a moderately light, easily chewed product with a satisfying bulk.

SUMMARY OF THE INVENTION

It is an object of the invention to provide a process and food product made therefrom that is a moderately light, easily chewed, fried pasta food product.

The process of the invention comprises:

passing a pasta flour and water mixture through a preconditioner at temperatures in the range of about 150° F. to about 210° F. for 20-180 seconds to partially pre-cook the mixture;

introducing the partially pre-cooked mixture into an extruder for passage through a cooking zone to produce a cooked mixture;

passing the cooked mixture through a venting zone under subatmospheric pressure to reduce the moisture content and temperature of said cooked mixture;

passing the mixture from the venting step to a forming zone and through an extrusion die to yield an extruded pasta product;

frying the extruded pasta product in oil at about 275°-400° F. with agitation for about 20-90 seconds; and recovering the fried pasta.

The pasta product resulting from the process of the invention is light and crunchy with a bulk sufficient to satisfy snacking hunger.

DETAILED DESCRIPTION

Figure 1:
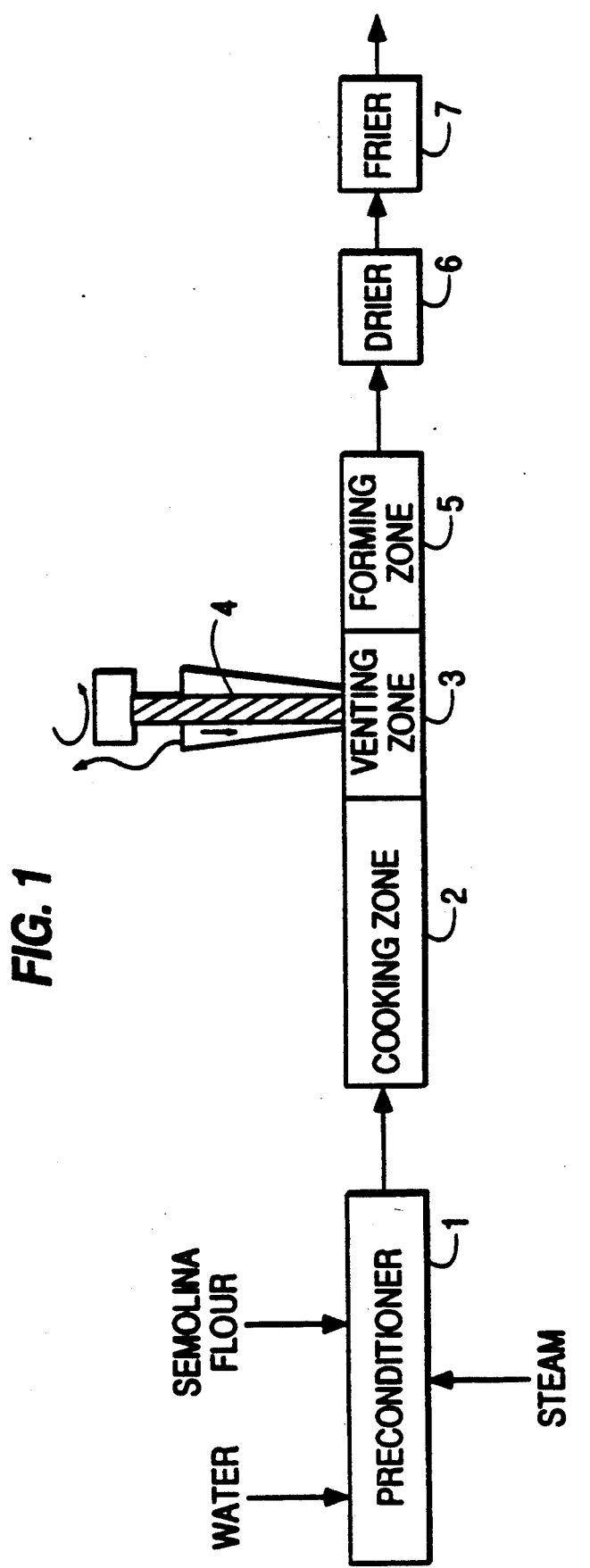
FIG. 1 is a block diagram of the processing sequence according to the invention.

The snack food according to the invention is based on a mixture of 87-92 wt % durum semolina wheat flour and about 8 to about 14, preferably about 11 to about 13 wt % water. Durum semolina wheat flour is characterized as having 12-14% protein, less than 3 g. fat, and 12-14 wt % moisture based on the flour. One or more extrusion agents such as monostearate surfactants can be used provided they are in minor quantities, e.g. less than about 1.5 wt %, and do not materially affect the nutritional value of the final food product.

The pasta that is fried in accordance with the invention is preferably made in accordance with U.S. Pat. No. 4,763,569 which is herein incorporated by reference. The apparatus is described in additional detail in U.S. Pat. No. 4,875,847 which is also incorporated herein by reference.

The apparatus and extrusion process described in those patents is conveniently explained with reference to the figures.

In accordance with the extrusion step of the present invention, durum wheat semolina flour and water are treated in a preconditioning stage, cooked, dehydrated, formed, dried, and fried. In preconditioner 1, the flour is mixed with water and heated to a temperature of about 160° F. to about 210° F. to partially pre-cook the flour and water mixture. Desirably, about 50 to 85% by weight of durum wheat semolina flour (preferably 70-85%) is mixed with about 15 to 50% by weight of water (preferably 15-30%). Preferably, the mixture in the preconditioner comprises from about 70 to 65% by weight of semolina flour and from about 30 to 35% by weight of water. The residence time in preconditioner 15 is about 20-180 seconds with a residence time of 1 minute to 2 minutes being preferred. Steam is preferably injected into preconditioner 1 as needed to adjust the temperature.

Once the durum wheat semolina flour and water have been partially pre-cooked and preconditioned, the mixture is introduced into an extruder and advanced along its length by axial rotation of one or more extruder screws. The extruder is preferably surrounded with heating/cooling means such as a jacket in which cooling or heating water or oil can circulate for subjecting the flour and water mixture to indirect thermal interchange during advancement along the length of the barrel. Other expedients such as electrical resistance, induction heating, or direct introduction of heated water or steam could also be employed. Preferably, the mixture during travel through the entire length of the extruder has a temperature in the range from approximately 130° F. to approximately 210° F. subject, of course, to the maximum temperatures in the cooking zone as set forth hereinabove. Optionally, the temperature of the mixture in the forming zone is less than the temperature of the same in the cooking zone.

The flour and water mixture is heated during advancement through cooking zone 2 to a maximum temperature of no more than about 215° F., although the preferred maximum temperature is about 205° F. The residence time of materials within the cooking zone is within the range of about 10 seconds to about 25 seconds and preferably about 15 seconds.

The cooked flour and water mixture is then passed to a venting zone 3 that operates under subatmospheric pressures. In venting zone 3, the cooked flour and water mixture is dehydrated to a relatively lower moisture content than that present through the cooking zone. The escape of moisture from the flour and water mixture also cools the mixture which facilitates handling and extrusion through the die. The pressure in venting zone 3 is preferably about 2-10 psia, most preferably about 6-9 psia.

Preferably, venting zone 3 includes means to prevent the cooked flour and water mixture from escaping the relatively higher pressure chambers of the extruder. A suitable restriction means is described in U.S. Pat. No. 4,763,569 which is a vertically oriented screw 4 that rotates so the threads advance toward the axis of the extruder. Any cooked flour and water mixture that would tend to move toward the vacuum source is urged downwardly by the movement of the threads.

Significant amounts of moisture are removed from the flour and water mixture during passage of the mixture through venting zone 3. Therefore, relatively large water can be used in the cooking zone to reduce the shear forces otherwise imposed upon the flour and water during their passage through cooking zone 2. Reducing the shear in cooking zone 2 increases product integrity after rehydration. Moreover, reducing the shear avoids a slimy texture of the product and decreases overall energy consumption of the extruder.

A vacuum greater than about 2.5 psia in venting zone 3 is described as useful in U.S. Pat. No. 4,763,569 for reducing the required product rehydration time and avoiding the formation of air bubbled in the product. Such rehydration times may be useful when the pasta product is heated in hot water, however, the pasta characteristics caused by the extrusion process make the product particularly useful for a fried snack food. The oil uptake and expansion characteristics produce a snack food having a pleasing texture and a medium level of bulk to produce a snack food with a satisfying density.

From venting zone 3, the flour and water mixture is passed to forming zone 5. In forming zone 5, the flour and water is subjected to high pressures and forced through at least one opening in at least one die plate. The residence time of the mixture in the forming zone is from about 20-60 seconds and preferably is approximately 45 seconds at a pressure within the forming zone of from about 200 to about 1200 psig, preferably about 500 psig to about 600 psig. The extruded pasta product preferably has a density of about 385-480 g/l.

As the mixture is passed through the die to yield an extruded product, a knife held under compression against the outside face of the die or dies cuts the extruded product to the desired length. The cut pasta products will have about 26-30 wt % water. The cut pasta products are advanced to drying station 6 to render the cut product suitable for frying.

The extruded products are preferably subjected to a temperature of from about 75°-180° F. in drying stage 6 for a period of about 20-60 minutes. Preferably, the extruded products are dried at a temperature of about 120° F. to about 140° F. for a period ranging from about 20 minutes to 30 minutes.

Drying is continued until the extruded pasta has about 8-14 wt % water. Preferably, the pasta is dried to about 11-13 wt % water. As a general rule, higher water contents result in a pasta product having a more open, airy texture. The highest levels of water present a practical problem with handling because the flour stream starts to resemble a slurry which does not extrude into fixed shapes.

The dried pasta is then passed to frier 7 containing hot oil at a temperature of about 275°-400° F. for 20-90 seconds with agitation. The oil is preferably a food grade vegetable oil. The fried product is drained, coated with any desired flavoring agents, and packaged. Preferred flavoring agents include garlic, cheese, hot spice, hot pepper-based, and pizza.

The following example illustrates the lightly crunchy nature of fried pasta products according to the invention.

EXAMPLE 1

A comparison was performed between an extruded pasta product thought to be extruded with conventional extrusion methods and a fried pasta product according to the invention (11% water). Conventional extrusion processes involve forcing a flour paste of less than 11% water through a die, cutting the extruded product to length, and frying the cut product in hot oil. Flavoring spices can be added either before or after the extrusion process depending on the stability of the agent through the frying process. The flavoring agents were added after the frying step for the example representative of the invention.

The conventional extrusion product is commercially available as a mixture of tube, clam shell, and spiral shapes. Where relevant, the measurements taken reflect which shape or form was tested. Fried pasta in the shape of a log having a cross section of a four-pointed star ("star" pasta) were also included in the test for further comparison. The product of the invention was extruded in the form of a spiral of about 1.5 inches in length and about 0.5 inches in diameter.

Each product was tasted and subjectively noted for texture and the ease with which the product was chewed. The subjective observations of the taste test are listed below in Table 1.

TABLE 1 conventional extrusion process:
The mixed shape product looks light and airy but actually has a hard crunch. The product breaks down in the mouth with some continued chewing.
star pasta:
The star-shaped logs are very hard, dry, and crunchy. They taste like "broken glass" and do not rehydrate in the mouth. The logs are dense.
embodiment of the invention:
The product of the invention appears to be light and airy which is the texture actually encountered in the mouth. The crunch is light. The inventive product seems to rehydrate in the mouth easily which makes the chewing enjoyable.

To place a relate relationship among these labels, the quality of each product was rated by number from 1 to 10. The number 10 denotes the highest magnitude.

TABLE 3

|  | Conventionally Extruded Pasta | Pasta Star | Invention |
|---|---|---|---|
| Hardness of Texture | 9 | 8 | 5 |
| Density | 5 | 10 | 7 |
| Pleasing feel in the mouth | 3 | 1 | 8 |
| Ease of rehydration | 7 | 3 | 9 |

EXAMPLE 2

The light crunch and airy texture experienced from the taste test was further investigated to determine whether such sensations corresponded to quantifiable physical measurements such as found in a test measuring the crush strength of the products. The test devised involved three repetitions of each sample except for the conventional fried pasta sample which is commercially available in three geometric shapes. For this sample, only one test per sample was performed.

The crush test involved the placing of three product samples in a triangle about 1 inch apart between two wooden planks that were about 2 ft×2 ft. in size and sufficiently thick to avoid substantial bending under the test weights. Weights in either 24 or 25 oz. increments were loaded onto the planks to minimize tilting of the planks. Accordingly, weights were loaded by starting in the center of the sample triangle with the 2nd and 3rd increments added simultaneously to sides of the center. Subsequent loads were stacked on top of the first loads until the product samples crushed.

Because the crushing occurred dramatically, the endpoint and crush strength were clear although it can only be said that the crush point was somewhere within the 24-25 ounce range where the break occurred. The crushing test results are in Table 3.

TABLE 3

|  | Crush Point | Average |
|---|---|---|
| Conventional fried pasta |  |  |
| (shell) | 275 oz. |  |
| (tube) | 177 oz. |  |
| (spiral) | 146 oz. | 199 oz. |
| Pasta star | 148 oz. |  |
|  | 100 oz. |  |
|  | 149 oz. | 132 oz. |
| Invention | 69 oz. |  |
|  | 68 oz. |  |
|  | 69 oz. | 68 oz |

As the crushing test establishes, the fried pasta product of the invention has a lower crush strength which translates into a snack food that is easier and more pleasant to eat than fried, conventionally extruded pasta.

We claim:

1. A fried pasta snack food containing wheat, said snack food having been made by a process comprising:
   passing a pasta mixture containing water and about 50-85 wt % wheat flour through a preconditioner at temperatures in the range of about 150° F. to about 210° F. for 20-180 seconds to partially pre-cook the mixture;
   introducing the partially pre-cooked mixture into an extruder for passage through a cooking zone to produce a cooked mixture;
   passing the cooked mixture through a venting zone under subatmospheric pressure to reduce the moisture content and also to reduce the temperature of said cooked mixture;
   passing the mixture from the venting step to a forming zone and through an extrusion die to yield an extruded pasta product having a density of about 385-480 g/l;
   cutting the extruded product to the length of a snack food;
   drying the cut pasta to a moisture level within the range from about 11-13% water;
   frying the dried pasta product in oil; and
   recovering the fried pasta as a snack food exhibiting a light and airy texture in the mouth with a light crunch.

2. A snack food according to claim 1 further comprising at least one flavoring agent which comprises garlic, cheese, hot spice, hot pepper-based, or pizza.

3. A process for making a fried pasta snack food containing wheat by a process comprising:
   passing a pasta mixture containing water and about 50-85 wt % wheat flour through a preconditioner at a temperature sufficient to partially pre-cook the mixture;
   introducing the partially pre-cooked mixture into an extruder for passage through a cooking zone to produce a cooked mixture;
   passing the cooked mixture through a venting zone under subatmospheric pressure to reduce the moisture content and also to reduce the temperature of said cooked mixture;
   passing the mixture from the venting step to a forming zone and through an extrusion die to yield an extruded pasta product having a density of about 385-480 g/l;
   cutting the extruded product to the length of a snack food;
   drying the cut pasta;
   frying the dried pasta product; and
   recovering the fried pasta as a snack food exhibiting a light and airy texture in the mouth with a light crunch.

* * * * *